US012801406B2

(12) United States Patent
Mi

(10) Patent No.: US 12,801,406 B2
(45) Date of Patent: Nov. 17, 2026

(54) INTERACTIVE DATA VALUE EDITING THROUGH GRAPHICAL VISUALIZATION TECHNIQUES

(71) Applicant: Minhong Mi, Newton, MA (US)

(72) Inventor: Minhong Mi, Newton, MA (US)

( * ) Notice: Subject to any disclaimer, the term of this patent is extended or adjusted under 35 U.S.C. 154(b) by 163 days.

(21) Appl. No.: 18/622,907

(22) Filed: Mar. 30, 2024

(65) Prior Publication Data

US 2024/0272785 A1 Aug. 15, 2024

(51) Int. Cl.

| | |
|---|---|
| ***G06F 9/451*** | (2018.01) |
| ***G06F 3/0482*** | (2013.01) |
| ***G06F 3/04845*** | (2022.01) |
| ***G06F 3/04847*** | (2022.01) |
| ***G06F 16/23*** | (2019.01) |
| ***G06F 16/26*** | (2019.01) |
| ***G06T 3/40*** | (2006.01) |
| ***G06T 7/11*** | (2017.01) |
| ***G06T 11/23*** | (2026.01) |
| ***G06T 11/26*** | (2026.01) |
| ***G06T 17/30*** | (2006.01) |

(52) U.S. Cl.

CPC ............ *G06F 9/451* (2018.02); *G06F 3/0482* (2013.01); *G06F 3/04845* (2013.01); *G06F 3/04847* (2013.01); *G06F 16/2365* (2019.01); *G06F 16/26* (2019.01); *G06T 3/40* (2013.01); *G06T 7/11* (2017.01); *G06T 11/23* (2026.01); *G06T 11/26* (2026.01); *G06T 17/30* (2013.01); *G06T 2200/24* (2013.01)

(58) Field of Classification Search

CPC ...... G06F 9/451; G06F 16/26; G06F 16/2365; G06F 3/0482; G06F 3/04845; G06F 3/04847; G06T 7/11; G06T 11/23; G06T 3/40; G06T 17/30

See application file for complete search history.

(56) References Cited

U.S. PATENT DOCUMENTS 4,674,043 A * 6/1987 Hernandez .............. G06F 40/18 715/209
5,990,888 A * 11/1999 Blades .................. G06T 11/206 715/764

(Continued)

*Primary Examiner* — William L Bashore
*Assistant Examiner* — Gregory A Distefano

(57) ABSTRACT

A method and system for interactive graph data editing are disclosed, providing an advanced approach to data visualization and manipulation within a computing environment. This invention enables the interactive adjustment of data values directly within graphical representations, such as line graphs, bar charts, and surface plots, through user interactions with graphical elements overlaying the visualization. Key features include real-time dynamic refreshing of these elements, generation of value modification records based on user interactions, and immediate application of these modifications to the data source, ensuring the visualization remains accurate and reflective of the underlying data. The system facilitates a more intuitive and efficient process for data analysis, accommodating various data sources and supporting a broad spectrum of computing system configurations. This method not only democratizes data analysis by making it accessible to users of varied expertise but also enhances collaborative efforts in data-driven decision-making processes.

8 Claims, 7 Drawing Sheets

(56) References Cited

U.S. PATENT DOCUMENTS

| | | | | |
|---|---|---|---|---|
| 9,563,674 | B2 * | 2/2017 | Hou | G06F 16/242 |
| 2004/0041838 | A1 * | 3/2004 | Adusumilli | G06F 16/2423 715/772 |
| 2010/0058250 | A1 * | 3/2010 | Stannard | G06T 11/206 715/856 |
| 2010/0060642 | A1 * | 3/2010 | Chhaparwal | G06T 11/206 345/440 |
| 2018/0225083 | A1 * | 8/2018 | Barkley | G10H 7/10 |
| 2019/0096102 | A1 * | 3/2019 | Weissbrod | G06T 11/206 |
| 2019/0220157 | A1 * | 7/2019 | Crouch | G06F 40/18 |

* cited by examiner

INTERACTIVE DATA VALUE EDITING THROUGH GRAPHICAL VISUALIZATION TECHNIQUES

TECHNICAL FIELD

This relates in general to the field of electric data processing, and more specifically to data visualization.

BACKGROUND

In the realm of data analysis and visualization, there has been an increasing recognition of the limitations inherent in traditional data manipulation methods, particularly those reliant on spreadsheet software for editing individual data points. These conventional approaches, while foundational to data analysis, often prove to be time-consuming, error-prone, and inadequate for handling the complex, dynamic nature of large datasets. As datasets grow in size and complexity, the need for more efficient, intuitive, and comprehensive data manipulation methods becomes paramount. The evolving landscape of data-driven decision making demands tools that can rapidly adjust and analyze multiple data points simultaneously, providing immediate visual feedback and facilitating a deeper understanding of data relationships and trends. Such tools are essential not only for enhancing the efficiency and accuracy of data analysis but also for democratizing data exploration, making it accessible to users with varied levels of expertise. Against this backdrop, the development of a method and system for interactive data value editing that allows for the collective manipulation of many data points represents a critical advancement, addressing the pressing need for more agile, intuitive, and inclusive data analysis technologies in a computing environment.

SUMMARY

This patent application introduces an innovative method and system for interactive data value editing through graphical visualization techniques within a computing environment. Designed to overcome the limitations of traditional data manipulation methods, this invention provides a user-friendly, efficient, and intuitive approach for the collective manipulation of numerous data points within graphical visualizations through user interactions with graphical elements overlaying the visualization. Leveraging the innate human capability to process visual information, the method enhances the understanding of complex data relationships and interactions, facilitating a deeper exploration of data-driven insights. This invention represents a paradigm shift towards a more dynamic, inclusive, and intuitive approach to data exploration and manipulation, marking a significant leap forward in the field of data analysis technologies.

The summary is provided to introduce a selection of concepts in a simplified form and thus not intended to identify key features or essential features of the claimed subject matter, nor is it intended to be used to limit the scope of the claimed subject matter.

DETAILED DESCRIPTION

This invention introduces an innovative approach to data analysis by enabling the collective manipulation of numerous datapoints within graphical visualizations, as opposed to the traditional, labor-intensive process of altering values one at a time in a spreadsheet. Such a method not only epitomizes efficiency and timesaving but also offers an intuitive, visually driven feedback mechanism that immediately showcases the effects of changes across the dataset or variable.

Figure 1:
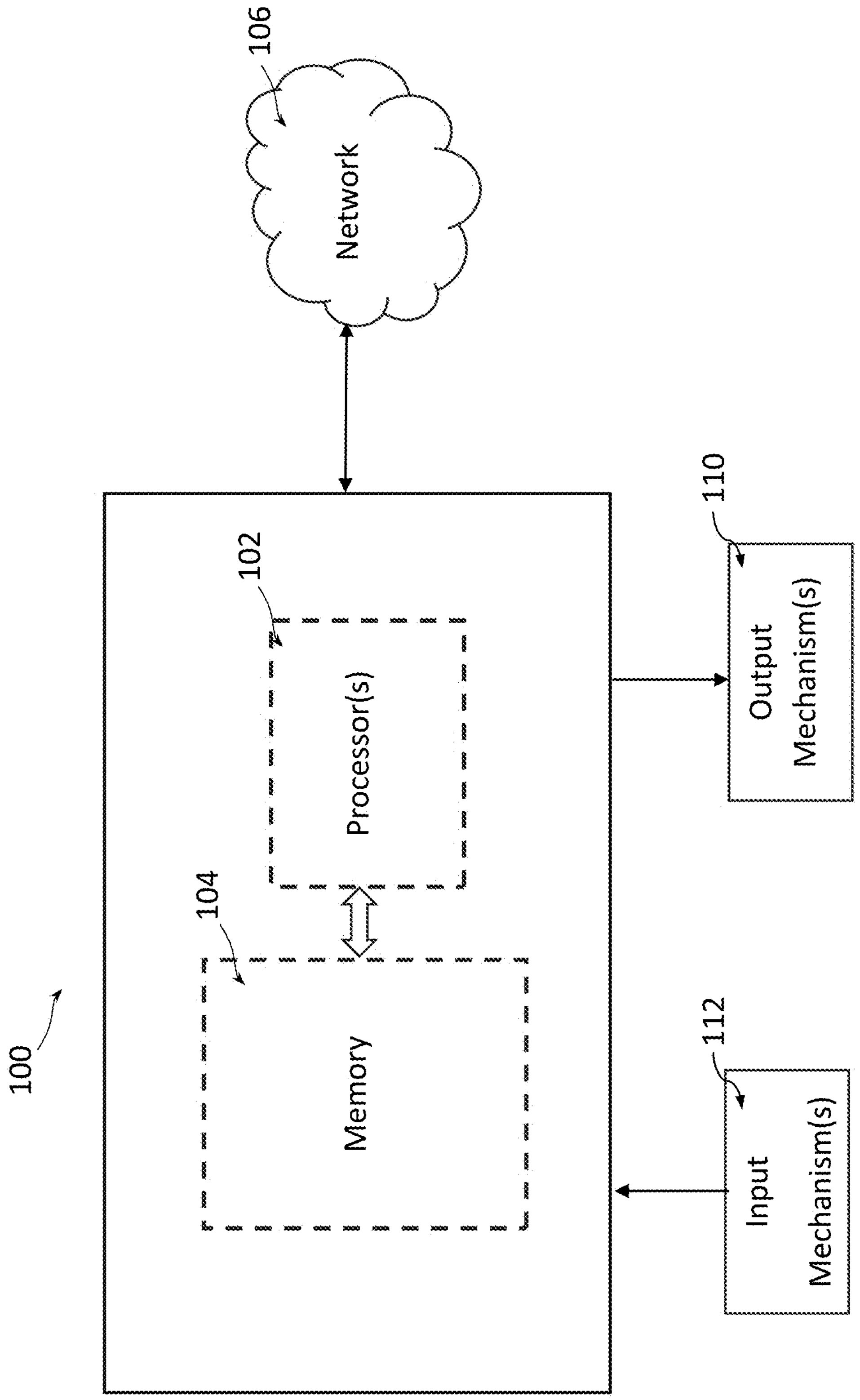
FIG. 1 illustrates a computing system in which the methodologies in accordance with the present invention may operate.

The provision of the method for data value editing through graphical visualization techniques is facilitated by a computing system 100 as illustrated in FIG. 1, which is inclusively defined to encompass any device or amalgamation of devices equipped with at least one physical, tangible processor 102 and a corresponding physical, tangible memory 104. This memory 104, capable of storing executable instructions for the processor, may vary in form based on the computing system's design and purpose. Notably, the computing infrastructure can span across networked environments 106 incorporating multiple interconnected systems. Furthermore, the computing system 100 may include both output mechanisms 110 and input mechanisms 112. Output mechanism 110 could range from speakers and screens to more advanced options like holograms and virtual reality. Similarly, input mechanisms 112 may cover a wide spectrum, from mouses and touchscreens to various sensors and physical controls, adapting to the specific needs and functionalities of the computing system.

Subsequent details elucidate that the described methodologies are executable across various computing systems, guided by software-driven processes. These processes entail the execution of computer-readable instructions by one or more processors, thereby orchestrating the computing system's operations, including data manipulation. Such instructions are typically housed on computer-readable media, forming the basis of a computer program product.

Experts in the field will recognize the invention's compatibility with a broad spectrum of computing system configurations. These range from personal to mainframe computers, including portable devices, multi-processor systems, consumer electronics, network PCs, and even emerging technologies like wearables. The invention is equally applicable in distributed computing setups, where tasks are allocated across both proximal and distal computing entities interconnected via a mix of wired and wireless networks, with software modules distributed across local and remote storage devices.

Furthermore, the invention is adeptly suited for implementation within cloud computing environments, characterized by the dynamic allocation of computing resources over a network. This model supports various operational characteristics (like on-demand self-service and rapid elasticity) and service models, including SaaS, PaaS, and IaaS, across different deployment models such as private, public, and hybrid clouds. In essence, the description and claims encompass the employment of cloud computing as an integral environment for the invention's application.

Data visualization and analysis software are computer program products that serve as essential tools for professionals across industries to visually interpret and interact with data. The practice of data visualization involves a complex process that transforms numerical and categorical data with dots, lines, and surfaces into visual formats, making the information more accessible and understandable. If the data visualization and analysis software program were operated on the computer system 100 mentioned above, the data visualization would be displayed through the output mechanism 110 and users would be able to interact with the data visualization through the input mechanism 112.

The data employed in analysis and visualization can come from a wide array of sources that cater to different analytical needs and objectives. Traditional spreadsheets, a staple in both business and academic settings, offer a straightforward, tabular way to organize and analyze data that can be directly visualized. Variables within programming environments or statistical software packages represent another common source, where data is manipulated and visualized through code, enabling dynamic and complex analyses. Databases, both relational and non-relational, serve as a backbone for storing vast amounts of structured and unstructured data, from which visualizations can extract and represent data trends, patterns, and anomalies.

For many commonly used graph types, such as scatter plots, line graphs, bar graphs, and surface plots, there is a direct and intuitive correspondence between the position of a data point and its actual value. This direct mapping allows viewers to easily interpret the data's magnitude, trend, or category by its spatial position; For instance, in a line graph drawn on a two-dimensional coordinate system, data points positioned higher on the y-axis signify larger values, whereas in a bar graph, the length of each bar directly correlates with the data's magnitude.

As data contexts and conditions change during data analysis, it is crucial to allow adjustment of data values on the fly as it enables analysts to simulate various scenarios and predict outcomes, enhancing decision-making processes. Interactive data modifications also democratize data analysis, enabling users with varied levels of expertise to engage with data more deeply and intuitively, fostering a broader understanding and generating insights more collaboratively. However, traditional interactive data manipulation methodologies typically necessitate utilizing spreadsheet or table interfaces, where modifications to data points are manually inputted via keyboard one by one. While these methods form the bedrock of data analysis, they are often marred by inefficiencies, susceptibility to errors, and a lack of flexibility, especially when navigating the complexities of voluminous and dynamic datasets.

Figure 2:
FIG. 2 is a flowchart that illustrates the steps involved in interactive data value editing through graphical data visualization techniques according to the invention.

The invention presents an advanced method for interactively editing multiple data points simultaneously by leveraging the direct correlation between data values and the geometric characteristics of their visual representations within a graphical visualization framework. As depicted in the detailed flowchart 200 in FIG. 2, the methodology for interactive data value editing through graphical visualization techniques unfolds across several meticulously designed steps, ensuring both precision and ease of use.

At the outset, as depicted by block 202, the program initiates the process by generating a graphical visualization tailored to a selected data source, which could originate from a diverse array of datasets as mentioned above. This visualization is not restricted to a single form but encompasses any variation that maintains a direct correlation between the data values and the geometric properties of its visual elements, thus allowing for a versatile range of applications.

Proceeding to block 204, the method introduces a graphical element overlay on the initial data visualization. This element is specifically designed to dynamically respond to user inputs, acting as a visual guide for the extent and intensity of the editing actions. The selection, characteristics, and implications of this graphical element on the data values are described in comprehensive detail in subsequent sections, highlighting its integral role in the editing process.

In block 206, the system ensures the graphical element's properties are updated in real-time, responding instantly to various forms of user interactions such as clicking, dragging, and resizing. This dynamic refresh capability underscores the method's interactive nature, offering users a seamless experience in data value manipulation.

Block 208 illustrates the creation of value modification records for data points impacted by the editing process. These records encapsulate the adjustments determined by the user's interaction with the graphical element, calculated through a specialized algorithm that takes into account the element's geometric transformations. This step is pivotal in translating user actions into precise data modifications.

Following this, block 210 describes applying the modifications captured in the value modification records to the original data source. This application process meticulously alters the data points in accordance with the recorded changes, ensuring the integrity and relevance of the data source are maintained.

Subsequently, block 212 details the update of the data visualization to accurately mirror the newly modified data source. This involves a sophisticated re-rendering of the visualization to depict the adjusted data points, thereby maintaining the visualization's accuracy and relevance to the underlying data source.

Finally, block 214 outlines the critical step of communicating the modifications to all associated data sources and dependent systems linked to the data visualization. This includes distributing detailed information about the changes and, where applicable, activating predefined actions or updates within those linked systems. This comprehensive notification process ensures that all relevant parties are informed of the modifications, facilitating a cohesive and synchronized response across the data ecosystem.

Together, these steps form a robust and intuitive method for interactive data value editing through graphical visualization techniques, representing a significant leap forward in data analysis and manipulation technology. In the following sections, more details of the method are illustrated with different choices of displayed graphical overlay elements for different applications. For the ease of explanation, these different options are named data value replacement, data value nudging, and data value spread adjustment, respectively.

Data Value Replacement

With the data value replacement option, the program overlays a user-drawn Bezier curve directly onto a two-dimensional data visualization for the purpose of editing data values. This curve acts as a template: data points falling within the curve's categorical axis range are assigned new values based on their alignment with the curve's value axis coordinates. This option provides a highly efficient and intuitive means of simultaneously applying a specific trend or pattern to numerous data points.

In a preferred embodiment, the program facilitates data value replacement through a user-friendly mode, accessible via menu selections, toolbar buttons, or other interface mechanisms. Users can engage in an interactive drawing process on their computer display using a peripheral device, such as a mouse. This process initiates when the user clicks on a data point within the visualization, marking the Bezier curve's starting point. Clicking the mouse adds additional control points at the cursor's location, which may or may not align with the visualization's data points. The drawing concludes with a double mouse click on a data point, establishing the final control point.

Upon completion of the Bezier curve, the software generates modification records for affected data points. It identifies these points by their indices, calculates new values based on their alignment with the curve, and records any differences from the original values. This process ensures that only significant changes are documented and applied to the spreadsheet, triggering updates to both the numerical data and any dependent visualizations or calculations.

Figure 3A:
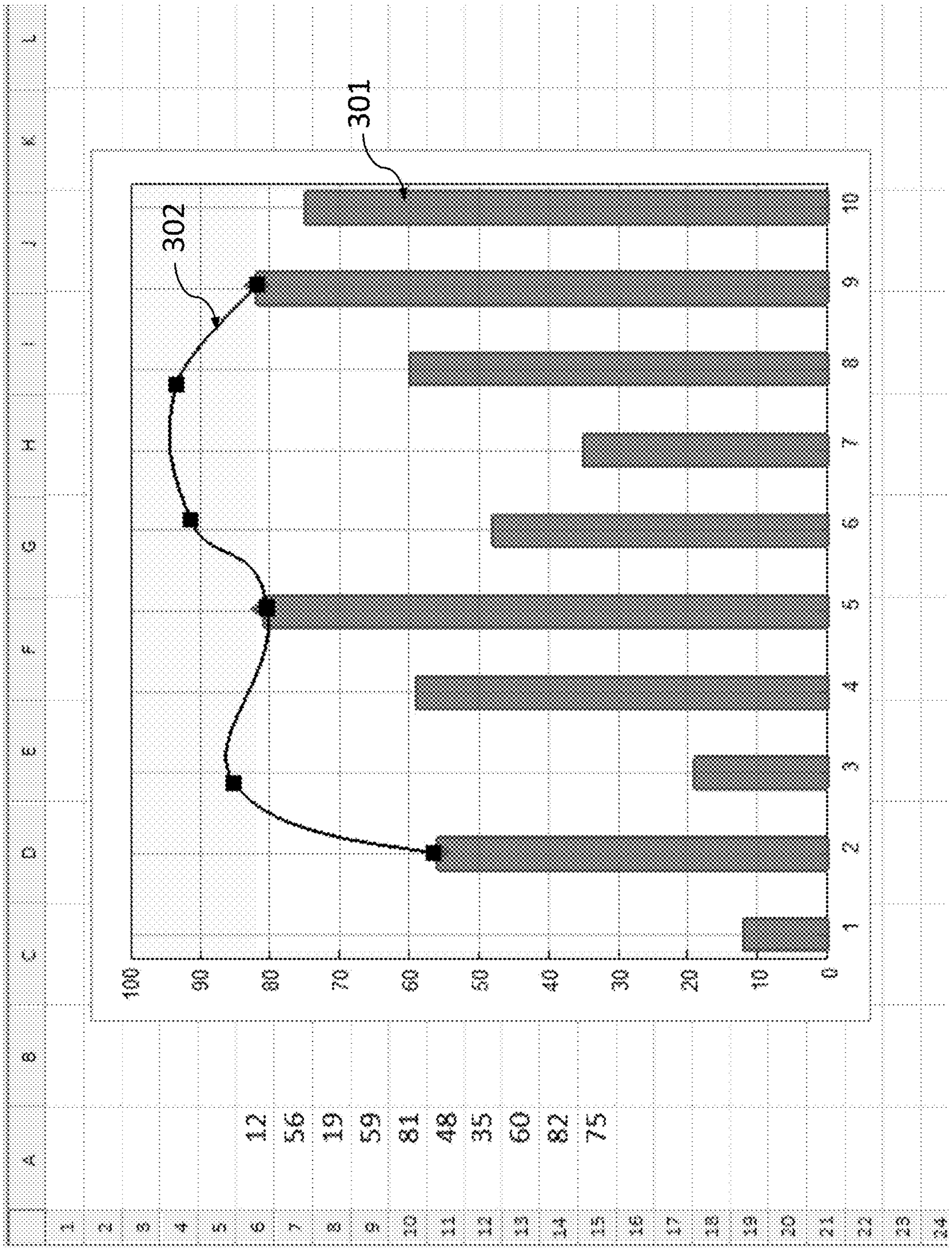
FIG. 3A is a screen shot of an exemplary bar graph wherein value editing is actively employed using a Bezier curve drawn by the user as a template according to the invention.
Figure 3B:
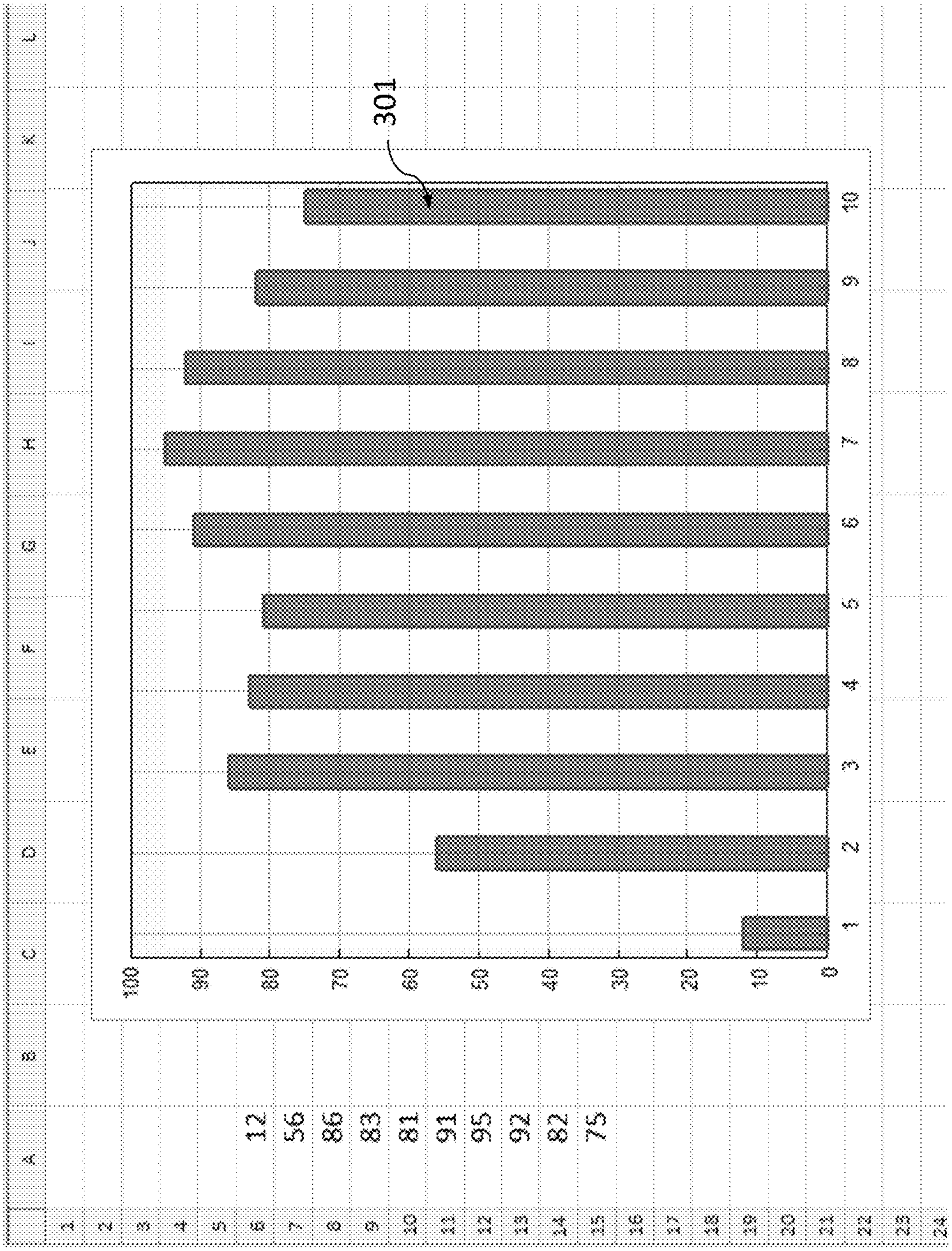
FIG. 3B is a screen shot of the bar graph after some values are replaced by those dictated by the user drawn Bezier curve according to the invention.

An example is provided in FIG. 3A to illustrate this concept with a bar graph 301 that converts spreadsheet data into a series of proportional rectangles. A Bezier curve 302 drawn across the graph modifies the heights of certain bars to align with specified control points, which are either directly associated with the data points or independently positioned. FIG. 3B shows a screen shot of the same bar graph 301 after the value editing operation, where cell values and bar heights are adjusted to reflect changes dictated by the Bezier curve, thereby demonstrating the dynamic and responsive nature of this data editing method.

Data Value Nudging

With the data value nudging option, the program displays a circle as visual indicator to facilitate the value editing process. Users can manipulate the values of data points encompassed by the circle simply by dragging it using a peripheral device, like a mouse. This option is especially advantageous for simultaneously adjusting multiple data points within a specific area, thereby altering their values cohesively without distorting their interrelationships.

In a refined implementation, the visual indicator employs a semi-transparent fill color, which transitions to greater transparency from the circle's center to its outer edge. Users can dynamically adjust the circle's radius through specific actions, such as scrolling with the mouse wheel while holding down the Shift key. The system cleverly positions the circle's center over the nearest data point relative to the cursor's location as the user moves the mouse. To begin a drag operation, the user clicks and holds the mouse button when over the circle's center. The software then memorizes the initial mouse location and adjusts the circle's center to follow the cursor's movement. If the movement along the value axis between the current and initial mouse positions exceeds a certain threshold, the software initiates the creation of value modification records for all data points within the circle's scope. The adjustment for each data point is calculated by multiplying a base value change, which directly correlates the mouse's travel distance to alterations in data values along the value axis, by a scaling factor. This factor is derived from a function that evaluates the spatial distance of each impacted data point from the circle's center against the circle's radius.

Figure 4A:
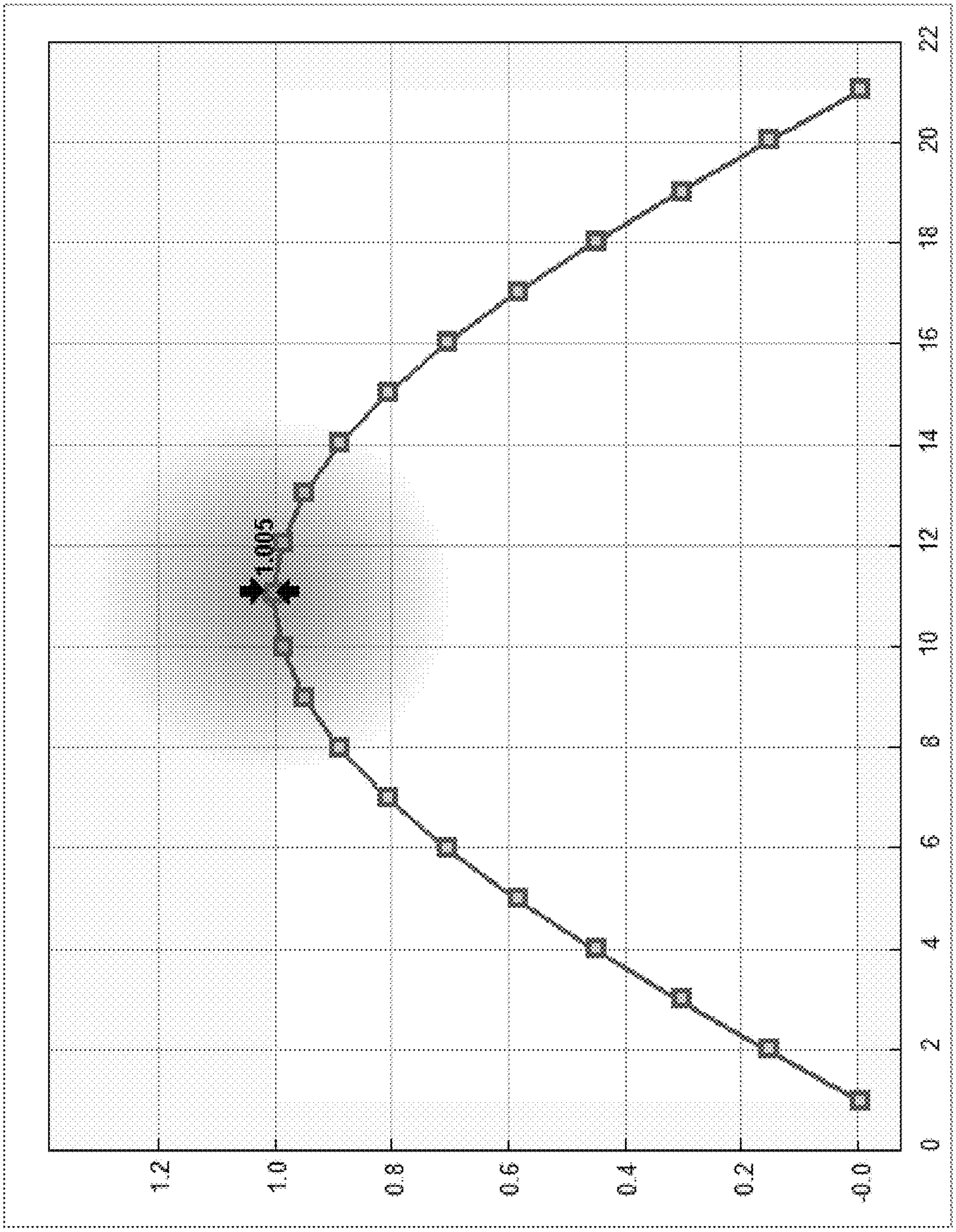
FIG. 4A is a screen shot of an exemplary line graph wherein the value nudging operation is actively employed according to the invention.
Figure 4B:
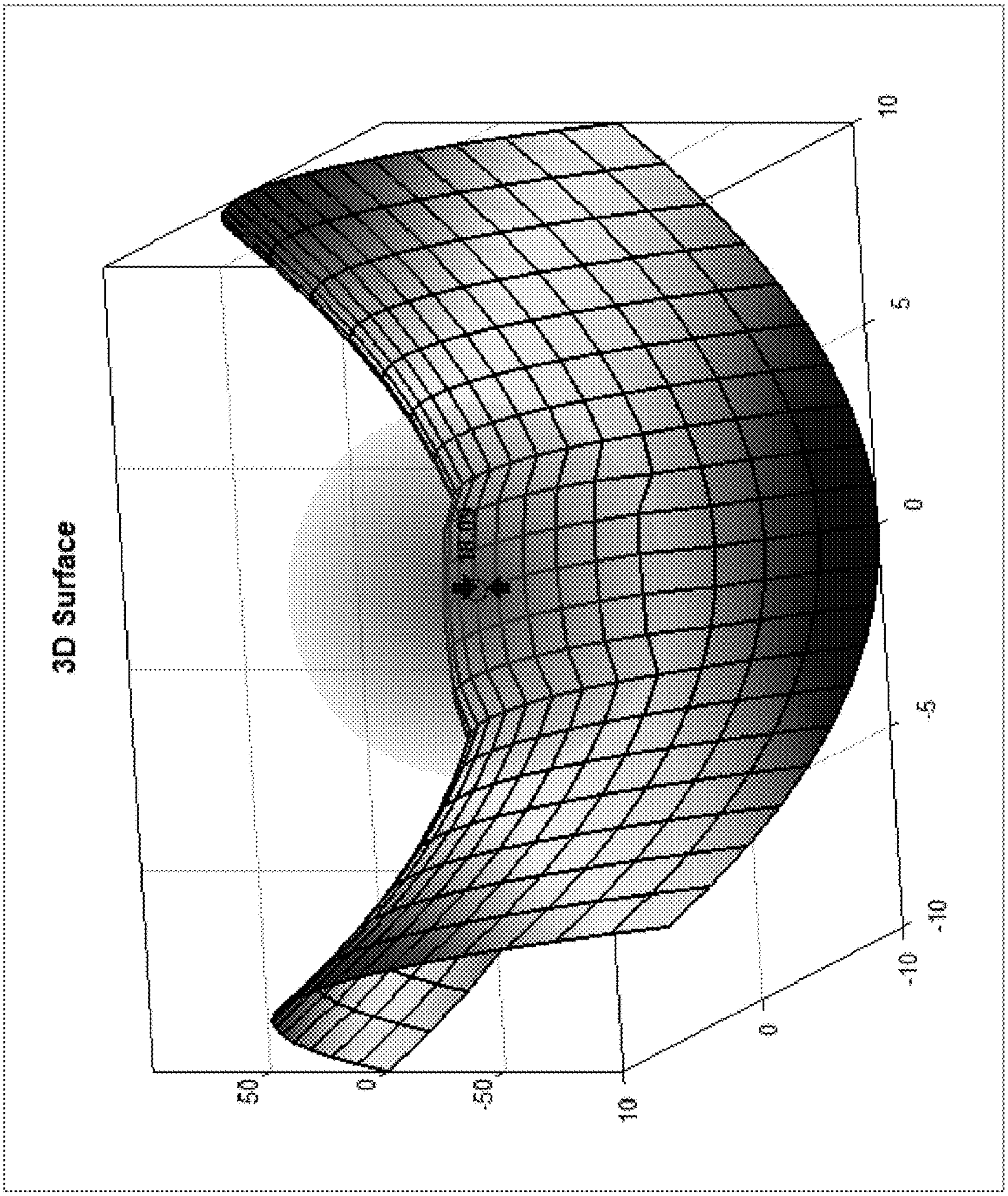
FIG. 4B is a screen shot of an exemplary three-dimensional surface graph wherein the value nudging operation is actively employed according to the invention.

It's essential to highlight that the data value nudging technique is versatile, supporting both two-dimensional and three-dimensional graphical representations. This is exemplified in FIG. 4A and FIG. 4B, which depict screen captures of a two-dimensional line graph and a three-dimensional surface plot, respectively, with the data value nudging operation actively being employed.

Data Value Spread Adjustment

Visual data representations often contend with the presence of noise within the source data, leading to graphs that might visually scatter or disperse around central tendencies, such as lines or surfaces. The data value spread adjustment option enables users to interactively refine the spread of graphical representations and thus change the noise levels in the source data.

Figure 5:
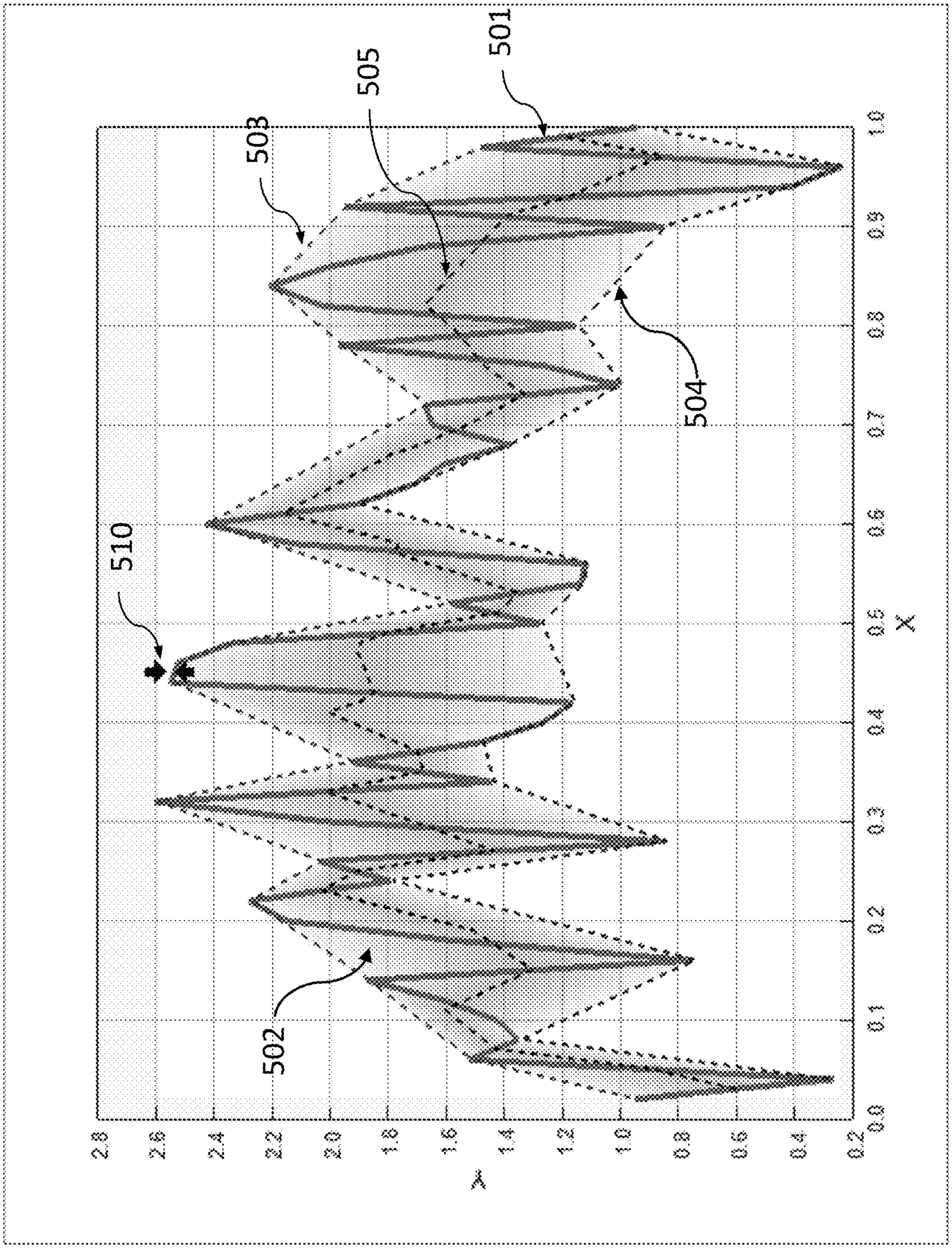
FIG. 5 is a screen shot of an exemplary line graph wherein the value spread adjustment operation is actively employed according to the invention.

In a preferred embodiment of this invention, the software provides a special mode for value spread adjustment operations. Entering the mode via menu selections, toolbar buttons, or other interface mechanisms transforms the user's interaction with the chart. Specifically, upon the cursor intersecting a graphically represented data point or segment, the system dynamically displays a semi-transparent polygon. This polygon visually represents the range of data value dispersion, delineated by constructing upper and lower boundary lines. For example, referring to FIG. 5, with the sample line graph labeled as 501, a polygon 502 materializes by interlinking points that collectively form an upper boundary line 503 and, similarly, points that establish a lower boundary line 504. These boundary lines are conceptualized by connecting data points based on their deviation from a computed moving average-termed the line of moving average 505. The upper boundary connects points above this moving average, while the lower boundary connects points below it, providing a visual scope of data spread.

The process for adjusting the value spread involves a user-initiated action; specifically, clicking and holding a mouse button over one of the boundary lines, which is visually indicated by a cursor change to a marker symbolizing bidirectional movement 510. Upon this action, the system records the cursor's initial position and monitors subsequent movements. When the cursor's displacement along the value axis surpasses a predefined threshold, the system generates a series of modification records for the data values associated with the boundary being adjusted. This modification for each data point is quantified by a formula that correlates the cursor's movement distance to changes in data values, adjusted by a scaling factor. This factor is calculated based on the proportional distance of each impacted data point from a reference point on the moving average line, standardized against the distance from the data point that is closest to the cursor position to its corresponding reference point on the moving average line.

The method of interactive data value editing through graphical visualization techniques, as detailed above, introduces a groundbreaking approach to data analysis and visualization. This method transcends the limitations of traditional data manipulation, offering a more efficient, user-friendly, and intuitive means of editing numerous data points within graphical visualizations. By enabling users to interact directly with graphical elements overlaid on the visualization, the system leverages the human ability to process visual information effectively, thereby enhancing the comprehension of complex data relationships and interactions. This innovative approach facilitates a deeper exploration of data-driven insights, allowing for the collective manipulation of data points through user-defined templates such as Bezier curves or interactive elements like circles and polygons.

One of the core benefits of this method is the immediate visual feedback provided to users as they interact with the graphical visualization. This real-time response mechanism not only showcases the impact of changes across the dataset but also encourages a more dynamic and exploratory approach to data analysis. Users can intuitively adjust data values, explore hypothetical scenarios, and assess the outcomes of their manipulations instantly, which is instrumental in fostering a deeper understanding of the data at hand.

Furthermore, the system's capacity to handle a diverse range of graphical representations—from line and column graphs to more complex surfaces and contours—ensures its applicability across various domains and data types. Whether simplifying the visualization of large datasets or refining the accuracy of data presentations, this method significantly enhances the analytical process. It streamlines the traditionally labor-intensive task of data value editing, transforming it into an interactive and engaging experience.

By democratizing data exploration, the invention makes sophisticated data analysis accessible to users with varying levels of expertise. This inclusivity extends the reach of data analysis tools to a broader audience, encouraging collaborative analysis and decision-making. The method's adaptability to different computing environments, from personal devices to cloud-based systems, underscores its versatility and potential for widespread adoption.

While the content discussed has been detailed using terminology specific to computer structure, methods, and computer-readable formats, it should be noted that the invention outlined in the claims attached is not confined to the particular details mentioned. Instead, these details are provided as illustrative examples of how the claims might be realized.

The subject matter outlined above is intended purely for illustrative purposes and should not be seen as restrictive. It is possible to apply various alterations and modifications to the described content without straying from the example embodiments and applications presented, and without deviating from the genuine essence and breadth of the current invention, as delineated in the subsequent claims.

What is claimed is:

1. A method executed by a computer system for interactive data value editing through graphical visualization techniques within a computing environment, the method comprising:

generating a graphical visualization tailored to a selected data source, wherein the said graphical data visualization is of a type selected from a group consisting of bar charts, scatter plots, line graphs, and surface plots, providing a direct and intuitive correspondence between the position of a data point and its actual value across various data categories including time series, categorical, and continuous data;

displaying a graphical overlay element on top of the graphical data visualization, wherein the graphical element is configured as a multifunctional interactive tool capable of performing geometric transformations including but not limited to translation, rotation, and scaling, to interactively adjust according to user interactions, wherein the graphical element is designed to support modifications of data points through direct manipulation, providing users with an intuitive means of adjusting data values by altering the geometric properties of the element, and wherein the displayed graphical overlay element is a circle with its center placed at the geometric center of a data point on the graphical visualization that is closest to a current pointer location, hereto referred to as a center data point;

dynamically refreshing geometric properties of the said graphical element in real-time in response to user interactions, wherein the user interactions include at least one of clicking, dragging, resizing, scrolling, or inputting numerical adjustments to the graphical element through a user interface, and wherein the center of the displayed circle is dynamically adjusted in response to pointer movements, the adjustment occurring during a drag operation wherein the circle's center is relocated to follow the movement path of the pointer;

generating value modification records for affected data points, wherein the value modification records include modifications to be applied to the data points based on the geometric properties of the graphical element and the type of user interaction, and wherein the modifications are calculated using a predefined algorithm that accounts for the geometric transformation of the graphical element, wherein a value modification record is generated for each data point with its geometric center falling within the boundaries of the area delimited by the perimeter of the displayed circle, and wherein the value modification in each value modification record is derived through a process that involves the multiplication of a base value adjustment by a scaling factor, the base value adjustment being obtained by establishing a direct correlation between the extent of pointer movement and the resultant variation in data values along a relevant axis, effectively mapping movement distance to data value changes, and the scaling factor being determined by a predefined function that computes its output based on the ratio of the spatial distance separating each affected data point from the designated center point relative to the radius of the encompassing circle displayed;

applying the value modification records to the underlying data source of the data visualization, wherein applying includes modifying data values of the affected data points in the data source according to the value modification record;

updating the data visualization with the modified source data to reflect changes made through the interactive graph data editing process, wherein the updating includes re-rendering the data visualization to visually represent the modifications to the data points, ensuring that the data visualization remains accurate and up-to-date with the underlying data source;

notifying all data sources and dependent systems linked to the underlying data of the graphical visualization about the value modification, including providing details of the modification and optionally triggering predefined actions or updates in the linked systems.

2. A method executed by a computer system for interactive data value editing through graphical visualization techniques within a computing environment, the method comprising:

generating a graphical visualization tailored to a selected data source, wherein the said graphical data visualization is of a type selected from a group consisting of bar charts, scatter plots, line graphs, and surface plots, providing a direct and intuitive correspondence between the position of a data point and its actual value across various data categories including time series, categorical, and continuous data;

displaying a graphical overlay element on top of the graphical data visualization, wherein the graphical element is configured as a multifunctional interactive tool capable of performing geometric transformations including but not limited to translation, rotation, and scaling, to interactively adjust according to user interactions, wherein the graphical element is designed to support modifications of data points through direct manipulation, providing users with an intuitive means of adjusting data values by altering the geometric properties of the element, and wherein the data visualization comprises a plurality of data points defined within a two-dimensional coordinate system, the coordinate system including a categorical axis and a value axis, and the graphical overlay element is a polygon, the polygon formed by connecting a series of points that define an upper boundary line and a series of points that define a lower boundary line of the data points, the construction of the upper boundary line involving connecting the data points whose values on the value axis exceed the moving average of the values of all data points plotted along the value axis, hereto referred to as the line of moving average, and the construction of the lower boundary line involving connecting the data points whose values on the value axis are below this moving average;

dynamically refreshing geometric properties of the said graphical element in real-time in response to user interactions, wherein the user interactions include at least one of clicking, dragging, resizing, scrolling, or inputting numerical adjustments to the graphical element through a user interface;

generating value modification records for affected data points, wherein the value modification records include modifications to be applied to the data points based on the geometric properties of the graphical element and the type of user interaction, and wherein the modifications are calculated using a predefined algorithm that accounts for the geometric transformation of the graphical element;

applying the value modification records to the underlying data source of the data visualization, wherein applying includes modifying data values of the affected data points in the data source according to the value modification record;

updating the data visualization with the modified source data to reflect changes made through the interactive graph data editing process, wherein the updating includes re-rendering the data visualization to visually represent the modifications to the data points, ensuring that the data visualization remains accurate and up-to-date with the underlying data source;

notifying all data sources and dependent systems linked to the underlying data of the graphical visualization about the value modification, including providing details of the modification and optionally triggering predefined actions or updates in the linked systems.

3. The method according to claim 2, wherein the locations of the points on a boundary line are dynamically adjusted in response to pointer movements during a drag operation. The drag operation is initiated by a mouse button click or a touch of the screen display while the pointer is within a certain distance from any part of the boundary line and continues until the button is released or finger is lifted from the screen.

4. The method according to claim 3, wherein a value modification record is generated for each data point on the said boundary line. The modification of value within each modification record is derived through a process that involves the multiplication of a base value adjustment by a scaling factor, wherein the base value adjustment is specifically obtained by establishing a direct correlation between the extent of pointer movement and the resultant variation in data values along the relevant axis, effectively mapping movement distance to data value changes, and the scaling factor is defined as the ratio of the spatial distance separating each affected data point and the corresponding point on the line of moving average with the same value along the categorical axis to the spatial distance separating the data point that is closest to the pointer and the corresponding point on the line of moving average with the same value along the categorical axis.

5. A computer system comprising:

a processor; and a computer-readable storage medium having computer-executable instructions stored thereon which, when executed by a computer, cause the apparatus to perform operations comprising:

generating a graphical visualization tailored to a selected data source, wherein the said graphical data visualization is of a type selected from a group consisting of bar charts, scatter plots, line graphs, and surface plots, providing a direct and intuitive correspondence between the position of a data point and its actual value across various data categories including time series, categorical, and continuous data;

displaying a graphical overlay element on top of the graphical data visualization, wherein the graphical element is configured as a multifunctional interactive tool capable of performing geometric transformations including but not limited to translation, rotation, and scaling, to interactively adjust according to user interactions, wherein the graphical element is designed to support modifications of data points through direct manipulation, providing users with an intuitive means of adjusting data values by altering the geometric properties of the element, and wherein the displayed graphical overlay element is a circle with its center placed at the geometric center of a data point on the graphical visualization that is closest to a current pointer location, hereto referred to as a center data point;

dynamically refreshing geometric properties of the said graphical element in real-time in response to user interactions, wherein the user interactions include at least one of clicking, dragging, resizing, scrolling, or inputting numerical adjustments to the graphical element through a user interface, and wherein the center of the displayed circle is dynamically adjusted in response to pointer movements, the adjustment occurring during a drag operation wherein the circle's center is relocated to follow the movement path of the pointer;

generating value modification records for affected data points, wherein the value modification records include modifications to be applied to the data points based on the geometric properties of the graphical element and the type of user interaction, and wherein the modifications are calculated using a predefined algorithm that accounts for the geometric transformation of the graphical element, wherein a value modification record is generated for each data point with its geometric center falling within the boundaries of the area delimited by the perimeter of the displayed circle, and wherein the value modification in each value modification record is derived through a process that involves the multiplication of a base value adjustment by a scaling factor, the base value adjustment being obtained by establishing a direct correlation between the extent of pointer movement and the resultant variation in data values along a relevant axis, effectively mapping movement distance to data value changes, and the scaling factor being determined by a predefined function that computes its output based on the ratio of the spatial distance separating each affected data point from the designated center point relative to the radius of the encompassing circle displayed;

applying the value modification records to the underlying data source of the data visualization, wherein applying includes modifying data values of the affected data points in the data source according to the value modification record;

updating the data visualization with the modified source data to reflect changes made through the interactive graph data editing process, wherein the updating includes re-rendering the data visualization to visually represent the modifications to the data points, ensuring that the data visualization remains accurate and up-to-date with the underlying data source;

notifying all data sources and dependent systems linked to the underlying data of the graphical visualization about the value modification, including providing details of the modification and optionally triggering predefined actions or updates in the linked systems.

6. A computer system comprising:

a processor; and a computer-readable storage medium having computer-executable instructions stored thereon which, when executed by a computer, cause the apparatus to perform operations comprising:

generating a graphical visualization tailored to a selected data source, wherein the said graphical data visualization is of a type selected from a group consisting of bar charts, scatter plots, line graphs, and surface plots, providing a direct and intuitive correspondence between the position of a data point and its actual value across various data categories including time series, categorical, and continuous data;

displaying a graphical overlay element on top of the graphical data visualization, wherein the graphical element is configured as a multifunctional interactive tool capable of performing geometric transformations including but not limited to translation, rotation, and scaling, to interactively adjust according to user interactions, wherein the graphical element is designed to support modifications of data points through direct manipulation, providing users with an intuitive means of adjusting data values by altering the geometric properties of the element, and wherein the data visualization comprises a plurality of data points defined within a two-dimensional coordinate system, the coordinate system including a categorical axis and a value axis, and the graphical overlay element is a polygon, the polygon formed by connecting a series of points that define an upper boundary line and a series of points that define a lower boundary line of the data points, the construction of the upper boundary line involving connecting the data points whose values on the value axis exceed the moving average of the values of all data points plotted along the value axis, hereto referred to as the line of moving average, and the construction of the lower boundary line involving connecting the data points whose values on the value axis are below this moving average;

dynamically refreshing geometric properties of the said graphical element in real-time in response to user interactions, wherein the user interactions include at least one of clicking, dragging, resizing, scrolling, or inputting numerical adjustments to the graphical element through a user interface;

generating value modification records for affected data points, wherein the value modification records include modifications to be applied to the data points based on the geometric properties of the graphical element and the type of user interaction, and wherein the modifications are calculated using a predefined algorithm that accounts for the geometric transformation of the graphical element;

applying the value modification records to the underlying data source of the data visualization, wherein applying includes modifying data values of the affected data points in the data source according to the value modification record;

updating the data visualization with the modified source data to reflect changes made through the interactive graph data editing process, wherein the updating includes re-rendering the data visualization to visually represent the modifications to the data points, ensuring that the data visualization remains accurate and up-to-date with the underlying data source;

notifying all data sources and dependent systems linked to the underlying data of the graphical visualization about the value modification, including providing details of the modification and optionally triggering predefined actions or updates in the linked systems.

7. The computer system according to claim 6, wherein the locations of the points on a boundary line are dynamically adjusted in response to pointer movements during a drag operation. The drag operation is initiated by a mouse button click or a touch of the screen display while the pointer is within a certain distance from any part of the boundary line and continues until the button is released or finger is lifted from the screen.

8. The computer system according to claim 7, wherein a value modification record is generated for each data point on the said boundary line. The modification of value within each modification record is derived through a process that involves the multiplication of a base value adjustment by a scaling factor, wherein the base value adjustment is specifically obtained by establishing a direct correlation between the extent of pointer movement and the resultant variation in data values along the relevant axis, effectively mapping movement distance to data value changes, and the scaling factor is defined as the ratio of the spatial distance separating each affected data point and the corresponding point on the line of moving average with the same value along the categorical axis to the spatial distance separating the data point that is closest to the pointer and the corresponding point on the line of moving average with the same value along the categorical axis.

* * * * *